(12) United States Patent
Kitabata

(10) Patent No.: US 11,374,295 B2
(45) Date of Patent: Jun. 28, 2022

(54) FILTER CIRCUIT AND COMMUNICATION DEVICE

(71) Applicant: Sony Group Corporation, Tokyo (JP)

(72) Inventor: Goh Kitabata, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/051,813

(22) PCT Filed: Feb. 5, 2019

(86) PCT No.: PCT/JP2019/003940
§ 371 (c)(1),
(2) Date: Oct. 30, 2020

(87) PCT Pub. No.: WO2019/215970
PCT Pub. Date: Nov. 14, 2019

(65) Prior Publication Data
US 2021/0126331 A1    Apr. 29, 2021

(30) Foreign Application Priority Data

May 8, 2018  (JP) .............................. JP2018-089842

(51) Int. Cl.
*H01P 1/203* (2006.01)
*H01Q 1/24* (2006.01)
*H04B 3/06* (2006.01)
(Continued)

(52) U.S. Cl.
CPC .............. *H01P 1/203* (2013.01); *H01Q 1/242* (2013.01); *H04B 3/06* (2013.01); *H04M 1/026* (2013.01); *H04B 1/0053* (2013.01)

(58) Field of Classification Search
CPC ........... H01P 1/203; H01Q 1/242; H04B 3/06; H04B 1/0053; H04M 1/026
See application file for complete search history.

(56) References Cited

U.S. PATENT DOCUMENTS 5,015,976 A * 5/1991 Saka ..................... H01P 1/2039
                                                        333/204
6,373,350 B1 * 4/2002 Fujita .................. H03H 9/0576
                                                        333/133

(Continued)

FOREIGN PATENT DOCUMENTS

CN       101421763 A     4/2009
CN       206116569 U     4/2017
(Continued)

OTHER PUBLICATIONS

International Search Report and Written Opinion dated Apr. 2, 2019 for PCT/JP2019/003940 filed on Feb. 5, 2019, 10 pages including English Translation of the International Search Report.
(Continued)

*Primary Examiner* — Nguyen T Vo
(74) *Attorney, Agent, or Firm* — Xsensus LLP

(57) ABSTRACT

To achieve a filter circuit that is configured to have a good frequency rejection characteristic and suppress an increase in size due to mounting, in a more preferred aspect.
A filter circuit includes a first signal line that is arranged to extend longitudinally, and a second signal line that is arranged to extend in parallel with the first signal line, in which the second signal line has one end that is electrically connected to the first signal line, and the other end that is open, in a longitudinal direction, and a length in the longitudinal direction that is determined according to a frequency of a signal to be blocked of signals transmitted through the first signal line.

9 Claims, 10 Drawing Sheets

(51) Int. Cl.
*H04M 1/02* (2006.01)
*H04B 1/00* (2006.01)

(56) References Cited

U.S. PATENT DOCUMENTS

| | | | |
|---|---|---|---|
| 8,115,574 B2 | 2/2012 | Adkins | |
| 8,384,498 B2* | 2/2013 | Grondahl | H01P 7/082 333/204 |
| 2006/0055610 A1 | 3/2006 | Borisov | |
| 2008/0129420 A1 | 6/2008 | Borisov | |
| 2010/0214039 A1* | 8/2010 | Lin | H05K 1/0216 333/204 |
| 2017/0346188 A1 | 11/2017 | Shimura | |

FOREIGN PATENT DOCUMENTS

| | | |
|---|---|---|
| CN | 106848505 A | 6/2017 |
| CN | 106921012 A | 7/2017 |
| JP | 2-131602 A | 5/1990 |
| JP | 2000100992 A | 4/2000 |
| JP | 2008022543 A | 1/2008 |
| JP | 2015-115707 A | 6/2015 |
| JP | 2017-216589 A | 12/2017 |
| JP | 2018-26717 A | 2/2018 |
| JP | 6278873 B2 | 2/2018 |
| KR | 20100066275 A | 6/2010 |
| WO | 2017/131727 A1 | 8/2017 |

OTHER PUBLICATIONS

Parimala et al., "Analysis of Stub Loaded Embedded With Open Loop Resonator for Multiband Band Pass Filter", International Journal of Engineering Trends and Technology, Jan. 2014, vol. 7, No. 3, pp. 155-159.

* cited by examiner

FILTER CIRCUIT AND COMMUNICATION DEVICE

CROSS-REFERENCE TO RELATED APPLICATIONS

The present application is based on PCT filing PCT/JP2019/003940, filed Feb. 5, 2019, which claims priority to JP 2018-089842, filed May 8, 2018, the entire contents of each are incorporated herein by reference.

FIELD

The present disclosure relates to a filter circuit and a communication device.

BACKGROUND

In a mobile communication system based on a communication standard called LTE/LTE-Advanced (A), radio signals having frequencies, called an ultra-high frequency, ranging from approximately 700 MHz to 3.5 GHz are mainly used for communication.

Furthermore, in recent years, various studies have been made on the fifth generation (5G) of mobile communication system following LTE/LTE-A. For example, in the mobile communication system, use of communication using radio signals having a frequency called a millimeter wave such as 28 GHz or 39 GHz (hereinafter, also simply referred to as "millimeter wave") is being studied. Against this background, various technologies that enable radio communication using millimeter waves are also being studied. For example, Patent Literature 1 discloses an example of a communication module for achieving radio communication using millimeter waves.

With achievement of radio communication using millimeter waves, for example, it is conceivable that a situation might arise where a frequency band used in mobile communication systems based on a conventional communication standard such as LTE/LTE-A is used together with a millimeter-wave band. Note that in the following description, a frequency band of 6 GHz or less including the frequency band used in the mobile communication system according to the conventional communication standard is also referred to as "sub-6 GHz band", for convenience.

CITATION LIST

Patent Literature

Patent Literature 1: Japanese Laid-open Patent Publication No. 2018-26717

SUMMARY

Technical Problem

On the other hand, although both of the sub-6 GHz band and the millimeter-wave band are available, it is conceivable that this might cause mutual interference (so-called self-interference) between a communication unit using the millimeter-wave band and a communication unit using the sub-6 GHz band. Therefore, under such a circumstance, for example, the communication unit using the sub-6 GHz band may be required to mount a mechanism (e.g., a filter circuit) to rejects a millimeter-wave band obtained as a result of reception, from a signal obtained as a result of the reception of the radio signal.

Furthermore, a wide range of communication devices are used in recent mobile communication systems and include relatively small devices such as so-called terminal devices, such as smartphones. In such a small communication device has a limited mounting space for a device for achieving radio communication, and thus, it is undesirable that the size significantly increases due to mounting of a filter circuit for removing a signal having an unnecessary frequency.

Therefore, the present disclosure proposes a technology for achieving a filter circuit that is configured to have a good frequency rejection characteristic and suppress an increase in size due to mounting, in a more preferred aspect.

Solution to Problem

According to the present disclosure, a filter circuit is provided that includes: a first signal line that is arranged to extend longitudinally; and a second signal line that is arranged to extend in parallel with the first signal line, wherein the second signal line has one end that is electrically connected to the first signal line, and another end that is open, in a longitudinal direction, and a length in the longitudinal direction that is determined according to a frequency of a signal to be blocked of signals transmitted through the first signal line.

Owing to such a configuration, the filter circuit can be mounted, for example, as part of a signal line between an antenna that transmits or receives a radio signal and a communication unit (e.g., an RF circuit) that controls transmission or reception of a radio signal via the antenna.

Moreover, according to the present disclosure, a communication device is provided that includes: a communication unit that controls a radio signal to be transmitted or received via an antenna; and a filter circuit that is arranged so as to be interposed between the antenna and the communication unit, wherein the filter circuit includes a first signal line that is arranged so as to extend longitudinally, and a second signal line that is arranged so as to extend in parallel with the first signal line, wherein the second signal line has one end that is electrically connected to the first signal line, and another end that is open, in a longitudinal direction, and a length in the longitudinal direction that is determined according to a frequency of a signal to be blocked, of signals transmitted through the first signal line, and the first signal line has one end that is electrically connected to the antenna, and another end that is electrically connected to the communication unit, in a longitudinal direction.

Advantageous Effects of Invention

As described above, according to the present disclosure, there is provided a technology for achieving a filter circuit that is configured to have a good frequency rejection characteristic and suppress an increase in size due to mounting, in a more preferred aspect.

Note that the effects described above are not necessarily limitative. With or in place of the above effects, there may be achieved any one of the effects described in this description or other effects that may be grasped from this description.

DESCRIPTION OF EMBODIMENTS

Figure 1:
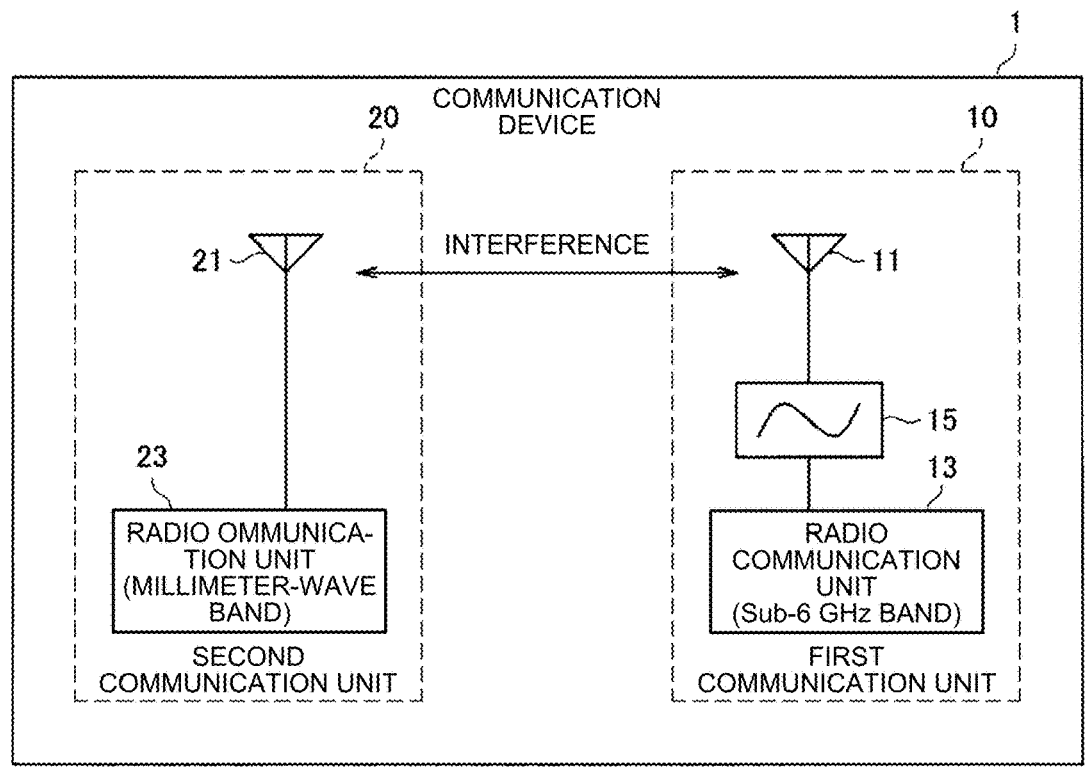
FIG. 1 is an explanatory diagram illustrating an example of a schematic configuration of a communication device that is formed in consideration of use of both sub-6 GHz band and millimeter-wave band.

Hereinafter, preferred embodiments of the present disclosure will be described in detail with reference to the accompanying drawings. Note that in the present description and the drawings, component elements having substantially the same functional configurations are designated by the same reference numerals, and a redundant description thereof will be omitted.

Note that the description will be given in the following order.
1. Schematic configuration
2. Study on use of millimeter-wave band
3. Technical features
3.1. Basic configuration
3.2. First configuration example
3.3. Second configuration example
3.4. Third configuration example
4. Conclusion

1. SCHEMATIC CONFIGURATION

Firstly, an example of a schematic configuration of a communication device (terminal device) in a case where millimeter-wave band is used for radio communication will be described.

As described above, in the fifth generation (5G) of mobile communication system following LTE/LTE-A, use of communication using radio signals having a frequency called a millimeter wave such as 28 GHz or 39 GHz (i.e., "millimeter wave") is being studied. In addition, with achievement of radio communication using millimeter waves, for example, it is also conceivable that a situation might arise where both the sub-6 GHz band and the millimeter-wave band are used.

For example, FIG. 1 is an explanatory diagram illustrating an example of a schematic configuration of a communication device that is formed in consideration of use of both sub-6 GHz band and millimeter-wave band, mainly illustrating a configuration of a portion relating to transmission or reception of a radio signals. A communication device 1 illustrated in FIG. 1 is configured as a communication device, such as a smartphone, capable of radio communication with another device (e.g., a base station or another terminal device).

As illustrated in FIG. 1, the communication device 1 includes a first communication unit 10 and a second communication unit 20. The first communication unit 10 mainly transmits or receives a radio signal in the sub-6 GHz band. Furthermore, the second communication unit 20 mainly transmits or receives a radio signal in the millimeter-wave band. The first communication unit 10 includes an antenna unit 11 and a radio communication unit 13. Furthermore, the second communication unit 20 includes an antenna unit 21 and a radio communication unit 23. In addition, the first communication unit 10 may include a filter circuit 15. Furthermore, although not illustrated, the second communication unit 20 may include a filter circuit corresponding to the filter circuit 15 in the first communication unit 10.

The antenna unit 11 radiates a signal output from the radio communication unit 13 in space as a radio wave (radio signal in the sub-6 GHz band). Furthermore, the antenna unit 11 converts a radio wave in space into a signal and outputs the signal to the radio communication unit 13.

The radio communication unit 13 transmits and receives a signal (signal in the sub-6 GHz band). For example, the radio communication unit 13 receives a downlink signal from a base station and transmits an uplink signal to the base station. Furthermore, as described above, the communication device 1 (terminal device) may transmit and receive a radio signal to and from another terminal device. In this case, the radio communication unit 13 receives a sidelink signal from the other terminal device and transmits a side link signal to the other terminal device. The radio communication unit 13 includes, for example, an RF circuit.

The filter circuit 15 rejects signals having frequencies not targets of radio communication (i.e., bands other than the sub-6 GHz band) from signals obtained as the results of reception of radio waves by the antenna unit 11. In other words, of signals transmitted from the antenna unit 11 to the radio communication unit 13, a signal in the sub-6 GHz band passes through the filter circuit 15 and the other signals in the other bands are blocked by the filter circuit 15. The filter circuit 15 can be configured as, for example, a surface acoustic wave (SAW) filter, a bulk acoustic wave (BAW) filter, a laminated filter, or the like.

The antenna unit 21 radiates a signal output from the radio communication unit 23 into space as a radio wave (radio signal in the millimeter-wave band). Furthermore, the antenna unit 21 converts a radio wave in space into a signal and outputs the signal to the radio communication unit 23.

The radio communication unit 23 transmits and receives a signal (signal in the millimeter-wave band). For example, the radio communication unit 23 receives a downlink signal from a base station and transmits an uplink signal to the base station. Furthermore, as described above, the communication device 1 (terminal device) may transmit and receive a radio signal to and from another terminal device. In this case, the radio communication unit 23 receives a sidelink signal from the other terminal device and transmits a side link signal to the other terminal device. The radio communication unit 23 includes, for example, an RF circuit.

An example of the schematic configuration of the communication device (terminal device) in a case where the millimeter-wave band is used for radio communication will be described above with reference to FIG. 1.

2. STUDY ON USE OF MILLIMETER-WAVE BAND

Next, a description will be made of the technical problem in a case where the millimeter-wave band is used for radio communication, particularly, in view of use of both the frequency band, such as the sub-6 GHz band, used in mobile communication systems based on a conventional communication standard and the millimeter-wave band, for radio communication.

As illustrated in FIG. 1, when the communication device 1 includes a plurality of communication units (e.g., the first communication unit 10 and the second communication rod 20) that use different frequency bands for radio communication, mutual interference may occur between the plurality of communication units. As a specific example, so-called self-interference may occur in which upon reception of a radio signal in the millimeter-wave band transmitted from the second communication unit 20 by the first communication unit 10, the radio signal in the millimeter-wave band interferes with a result of reception by the first communication unit 10.

In such a case, for example, a filter that is configured to reject a result (i.e., signal in the millimeter-wave band) of reception of a radio signal in the millimeter-wave band transmitted from the second communication unit 20 is desirably applied as the filter circuit 15 to the first communication unit 10. On the other hand, in a conventional communication device, rejection of the millimeter-wave band is not considered, and a filter showing good electrical characteristic (i.e., good frequency rejection characteristic) has not been applied for the filter circuit 15. As a specific example, a SAW filter or BAW filter exceeds the range of frequencies that can be supported, and thus, it may be difficult to obtain the good frequency rejection characteristic in the millimeter-wave band. Furthermore, even when a device having a characteristic of a low-pass filter or band-pass filter is applied as the filter circuit 15, it may be difficult to block a signal in the millimeter-wave band.

Figure 2:
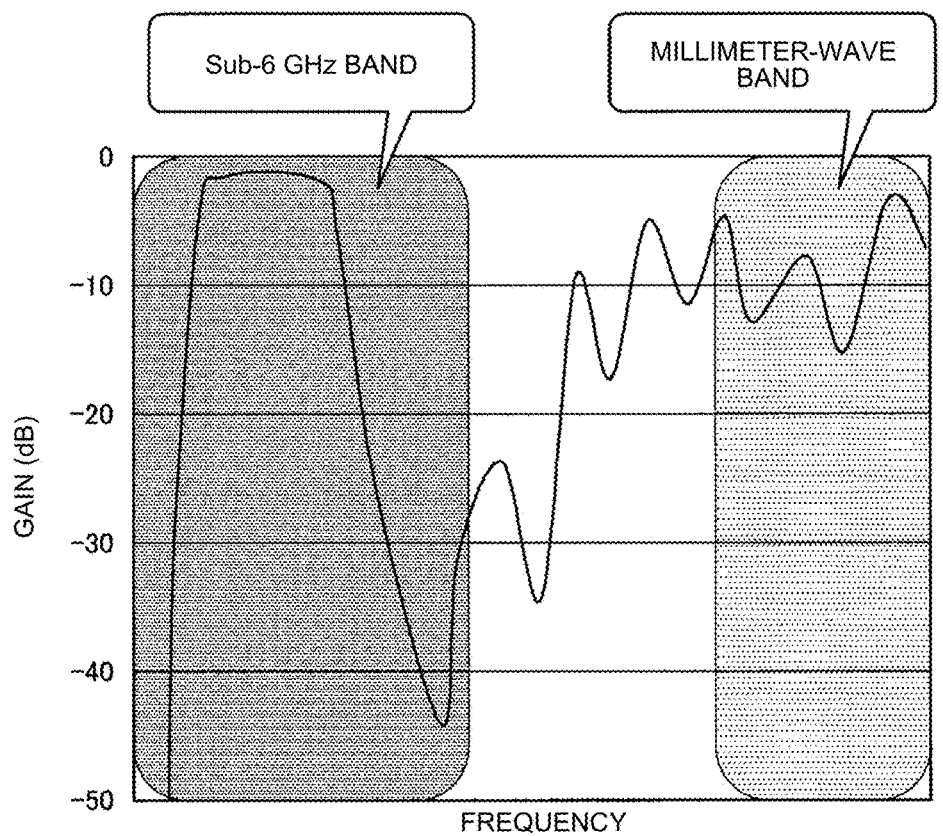
FIG. 2 is a graph illustrating an example of a device characteristic of a filter circuit applied in a conventional communication device.

For example, FIG. 2 is a graph illustrating an example of a device characteristic of a filter circuit applied in a conventional communication device. In FIG. 2, the horizontal axis represents frequency. The vertical axis represents gain. In the example illustrated in FIG. 2, the sub-6 GHz band shows a good characteristic of passing a signal in a desired band and blocking a signal in another band. On the other hand, in the example illustrated in FIG. 2, it can be seen that sufficient attenuation characteristic (attenuation) is not obtained in the millimeter-wave band.

Furthermore, in the filter circuit that is obtained by combining an inductor L and a capacitor C, existing elements do not meet a requirement for constants, and combined conventional elements would be operated above a self-resonance frequency, making it sometimes difficult to obtain good characteristics. Furthermore, when a surface mounted device is applied as the filter circuit, floating or the like of the filter circuit caused by variations in soldering may cause variations in the characteristics of the filter circuit.

In view of the situation as described above, in the communication device according to the present disclosure, the filter circuit configured to reject the millimeter-wave band is achieved by partially forming a signal line (so-called stripline) that is arranged between the antenna and the radio communication unit (RF circuit) so as to be used for transmitting and receiving signals, as a notch filter using a stub (hereinafter, also referred to as "stub filter").

Figure 3:
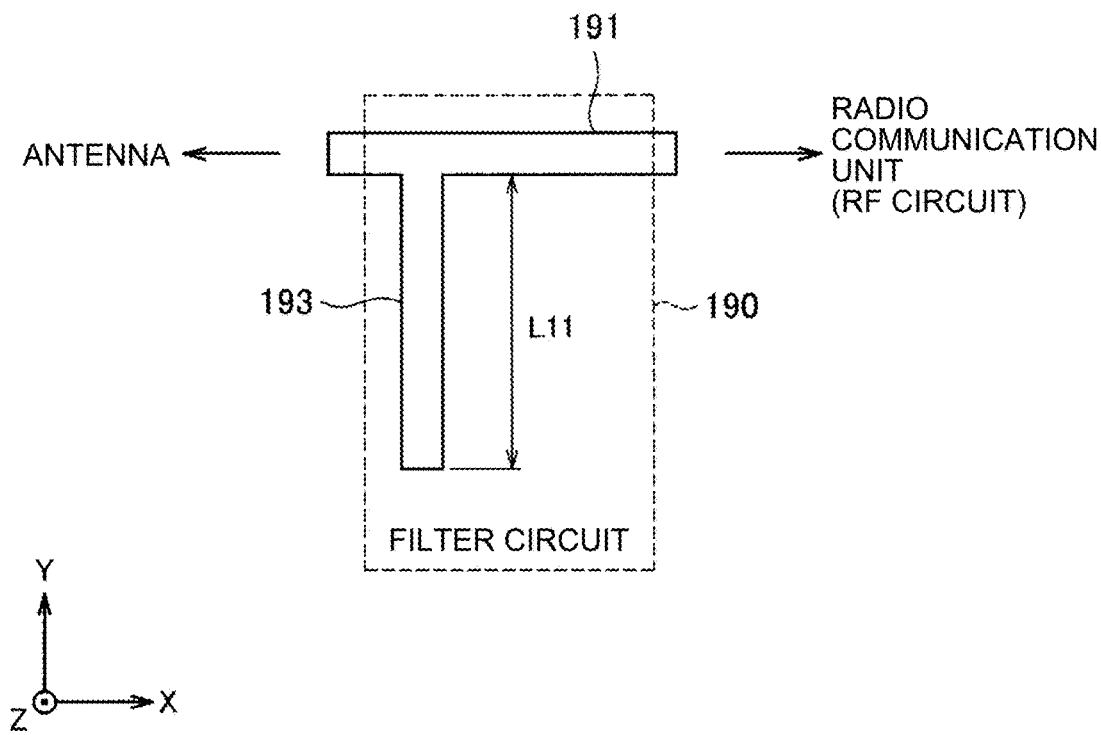
FIG. 3 is an explanatory diagram illustrating an example of a schematic configuration of a filter circuit according to a comparative example.

Here, for easier understanding of the characteristics of a filter circuit according to an embodiment of the present disclosure, an example of a configuration of the stub filter will be described as a comparative example. For example, FIG. 3 is an explanatory diagram illustrating an example of a schematic configuration of a filter circuit according to a comparative example, illustrating an example of the filter circuit configured as a stub filter. In the example illustrated in FIG. 3, directions on a plane of a substrate on which the filter circuit (stub filter) is formed are represented as an x-direction and a y-direction, and a direction normal to the substrate is represented as a z-direction, for convenience. Furthermore, of the directions on the plane of the substrate (i.e., the x-direction and the y-direction), a direction in which a signal line arranged between an antenna and a radio communication unit (RF circuit) extends is defined as the x-direction, and a direction on the plane of the substrate orthogonal to the x-direction is defined as the y-direction.

As illustrated in FIG. 3, a filter circuit 190 according to the comparative example includes a first signal line 191 and a second signal line 193. The first signal line 191 corresponds to at least part of the signal line (stripline) provided between the antenna and the radio communication unit (RF circuit). Furthermore, the second signal line 193 is formed as a so-called stub (stub line). Specifically, the second signal line 193 is formed to extend from a portion of the first signal line 191 in a direction (y-direction) orthogonal to the direction (x-direction) in which the first signal line 191 extends. In other words, the second signal line 193 has one end in a longitudinal direction (y-direction) that is electrically connected to the first signal line 191 and the other end that is open.

The frequency band of a signal that is a blocking target to be blocked by the filter circuit 190 configured as the stub filter is determined according to a length L11 of the second signal line 193 corresponding to the stub line in the longitudinal direction (y-direction). Specifically, the length L11 of the second signal line 193 needs to be substantially equal to ¼ of the wavelength of a signal being the blocking target. As a more specific example, when blocking a 28 GHz signal, the length L11 of the second signal line 193 is approximately 1.5 mm. Moreover, providing a plurality of second signal lines 193 makes it possible to obtain a better electrical characteristic (i.e., better frequency rejection characteristic).

On the other hand, the filter circuit 190 according to the comparative example tends to have relatively large occupied area due to a structural feature in which the second signal line 193 is formed to extend in the direction (y-direction) orthogonal to the direction (x-direction) in which the first signal line 191 extends. In particular, a relatively small communication device (terminal device) such as a smartphone has a limited mounting space for devices (e.g., an antenna, RF circuit, etc.) for achieving radio communication, and it is undesirable that the filter circuit 190 has a significantly large occupied area.

Furthermore, forming the second signal line 193 with respect to the first signal line 191 may cause a change in the electrical characteristic (e.g., impedance) of the portion in which the filter circuit 190 is provided, thereby exposing the change in the electrical characteristic as a change in a signal transmitted through the first signal line 191. Such influences on an electrical characteristic (impedance) of the filter circuit 190 can be reduced by reducing the line widths of the first signal line 191 and the second signal line 193. On the other hand, due to physical constraints on processing when forming the first signal line 191 and the second signal line 193, the first signal line 191 and the second signal line 193 may each have a line width limited up to approximately 40 µm, even if formed as small as possible. Note that in the present disclosure, the words "line width" corresponds to, for example, the width of a conductive foil in a case where a stripline or microstripline is applied as the signal line, that is, corresponds to a length in a direction orthogonal to both of a direction in which the conductive foil extends and a thickness direction of the conductive foil.

In view of the situation as described above, the present disclosure proposes a technology for achieving, in a more preferred aspect, a filter circuit that is configured to achieve a good frequency rejection characteristic and suppress an increase in size due to mounting.

3. TECHNICAL FEATURES

Next, as technical characteristics of a communication device according to an embodiment of the present disclosure, description will be made particularly in view of a characteristic of a filter circuit provided to be interposed between an antenna and a radio communication unit (RF circuit).

3.1. Basic Configuration

Firstly, the outline of a basic configuration of a filter circuit according to an embodiment of the present disclosure will be described. In the filter circuit according to an embodiment of the present disclosure, a signal line (i.e., stripline) arranged between an antenna and a radio communication unit (RF Circuit) to be used for transmission and reception of signals is partially formed as a stub filter, and thus, the filter circuit is achieved as a filter circuit that is capable of rejecting millimeter waves.

Figure 4:
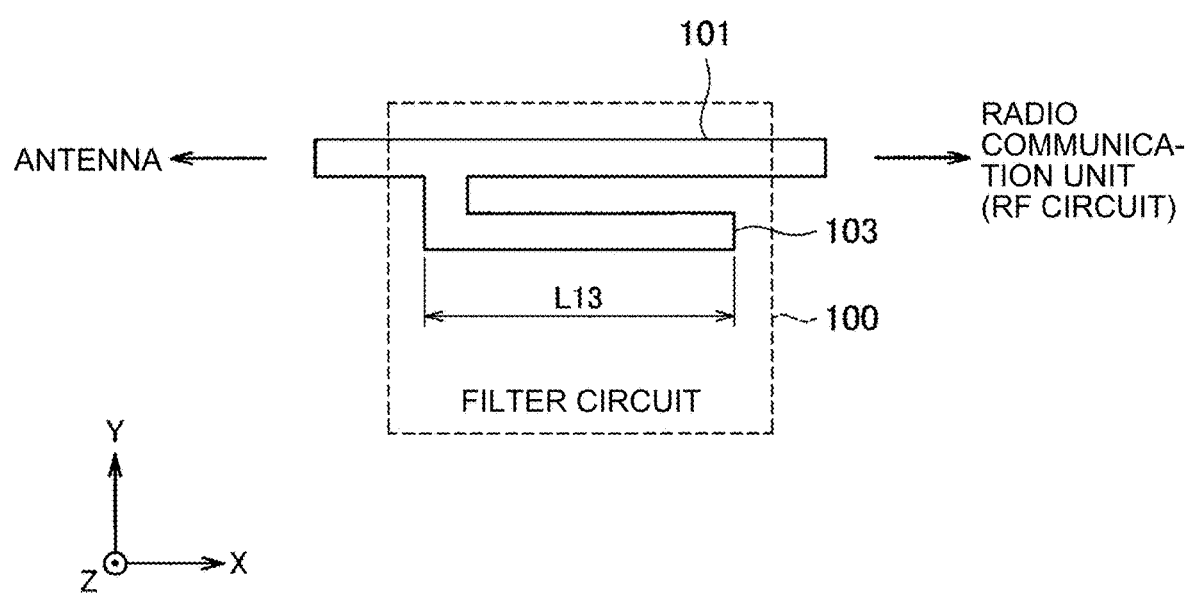
FIG. 4 is an explanatory diagram illustrating an outline of a basic configuration of a filter circuit according to an embodiment of the present disclosure.

For example, FIG. 4 is an explanatory diagram illustrating the outline of a basic configuration of the filter circuit according to an embodiment of the present disclosure. In the example illustrated in FIG. 4, directions on a plane of a substrate on which the filter circuit (stub filter) is formed are represented as an x-direction and a y-direction, and a direction normal to the substrate is represented as a z-direction, for convenience. Furthermore, of the directions on the plane of the substrate (i.e., the x-direction and the y-direction), a direction in which a signal line arranged between an antenna and a radio communication unit (RF circuit) extends is defined as the x-direction, and a direction on the plane of the substrate orthogonal to the x-direction is defined as the y-direction. Furthermore, in the example illustrated in FIG. 4, for convenience, the right direction in the drawing is defined "+x-direction" and the left direction is "−x-direction". Furthermore, the upward direction in the drawing is defined as "+y-direction" and the downward direction in the drawing is defined as "−y-direction".

As illustrated in FIG. 4, the filter circuit 100 according to the present embodiment includes a first signal line 101 and a second signal line 103. The first signal line 101 corresponds to at least part of the signal line (stripline) provided between the antenna and the radio communication unit (RF circuit). Furthermore, the second signal line 103 is formed as a so-called stub (stub line). Specifically, the second signal line 103 is arranged so as to extend in parallel with the first signal line 101. In other words, the second signal line 103 is formed so as to extend in a longitudinal direction of the first signal line 101. The second signal line 103 has one end in a longitudinal direction (x-direction) that is electrically connected to the first signal line 101 and the other end that is open.

The frequency of a signal that is a blocking target to be blocked by the filter circuit 100 is determined according to a length L13 of the second signal line 103 in the longitudinal direction (x-direction). Specifically, the length L13 of the second signal line 103 needs to be substantially equal to ¼ of the wavelength of a signal being the blocking target.

Furthermore, the second signal line 103 and a predetermined range that includes a portion of the first signal line 101 electrically connected to the second signal line 103 and are each preferably formed to have a smaller line width. With such a configuration, it is possible to further reduce the influence of the change in an electrical characteristic (impedance) of the filter circuit 100 due to the provision of the second signal line 103. Note that, due to physical constraints on forming the first signal line 101 and the second signal line 103, the first signal line 101 and the second signal line 103 may each have a line width limited up to approximately 40 µm, even if formed as small as possible, as in the filter circuit 190 according to the comparative example described above. As a matter of course, if there is no physical constraints, each of the first signal line 101 and the second signal line 103 may be formed to have a line width less than 40 µm.

The filter circuit 100 according to an embodiment of the present disclosure configured as described above is applied, for example, as the filter circuit 15 illustrated in FIG. 1.

The outline of the basic configuration of the filter circuit according to an embodiment of the present disclosure has been described above with reference to FIG. 4.

3.2. First Configuration Example

Next, as a first configuration example of the filter circuit according to an embodiment of the present disclosure, an example of a configuration of a filter circuit that is provided with a plurality of second signal lines 103 (i.e., stub lines) will be described. Note that in the following description, the filter circuit according to the first configuration example may be referred to as "filter circuit 110" for distinction thereof from a filter circuit according to another configuration example. On the other hand, when the filter circuit according to the first configuration example and a filter circuit according to another configuration example are not particularly distinguished from each other, the filter circuits may be referred to as "filter circuits 100".

Configuration

Figure 5:
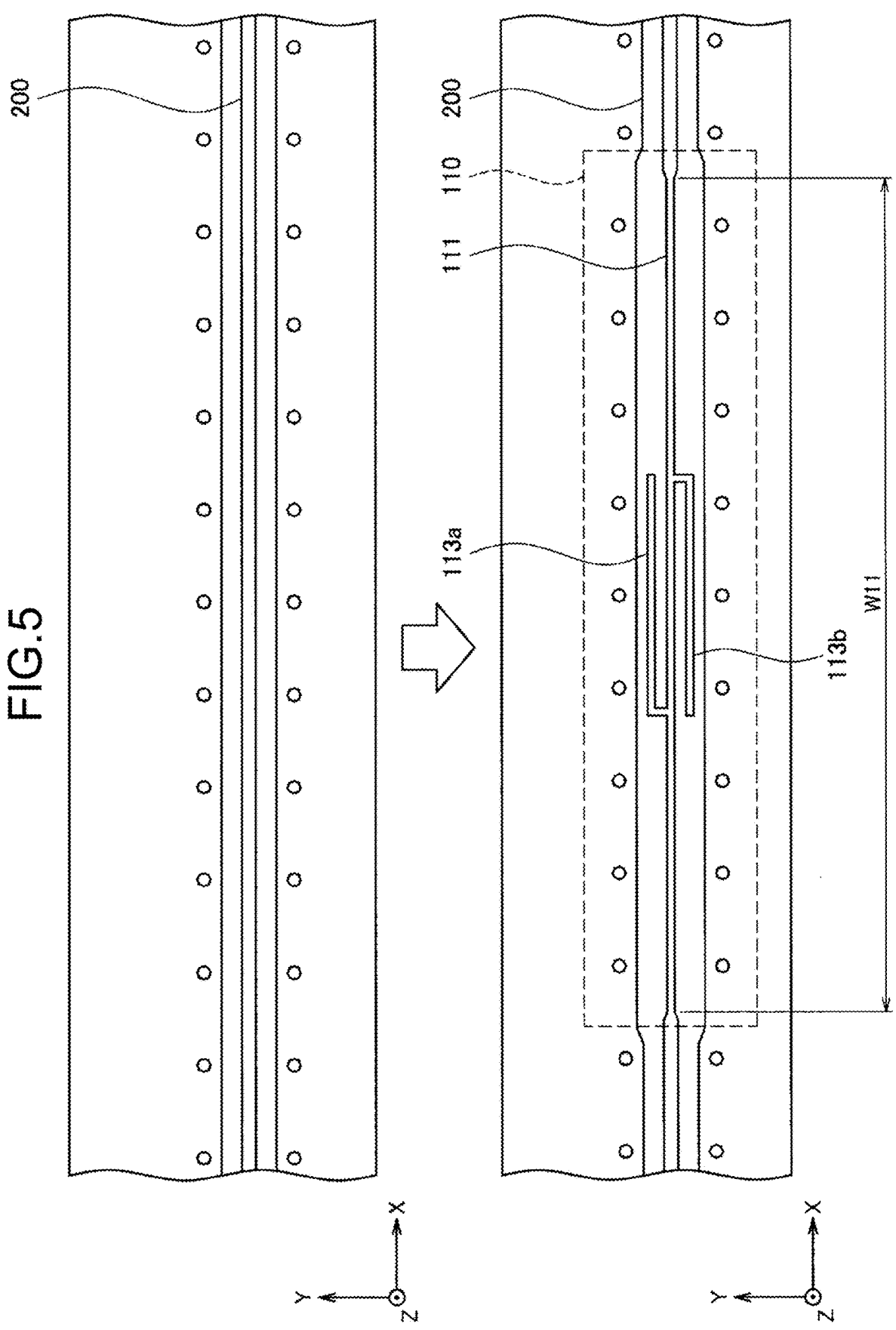
FIG. 5 is an explanatory diagram illustrating an outline of a first configuration example of the filter circuit according to the embodiment.

For example, FIG. 5 is an explanatory diagram illustrating an outline of the first configuration example of the filter circuit according to an embodiment of the present disclosure. In FIG. 5, an upper diagram illustrates a configuration of a signal line 200 (stripline) before the filter circuit according to an embodiment of the present disclosure is formed. On the other hand, a lower diagram of FIG. 5 illustrates an example of a configuration of the filter circuit 110 when part of the signal line 200 illustrated in the upper diagram is configured as the filter circuit 110 according to an embodiment of the present disclosure. An x-direction, y-direction, and z-direction in the upper diagram and lower diagram of FIG. 5 correspond to the x-direction, y-direction, and z-direction in the example illustrated in FIG. 4.

The signal line 200 electrically connects an antenna and a radio communication unit (RF circuit) and transmits a signal from one of the antenna and the radio communication unit to the other thereof. Specifically, a signal obtained as a result of reception of a radio wave by the antenna is transmitted from the antenna to the radio communication unit via the signal line 200. Furthermore, a signal generated by the radio communication unit is transmitted from the radio communication unit to the antenna via the signal line 200, and a radio wave according to the signal is radiated from the antenna. The signal line 200 is configured as, for example, a stripline (microstripline) adjusted to have a characteristic impedance of 50Ω. As illustrated in FIG. 5, part of the signal line 200 in a longitudinal direction (x-direction) is configured as the filter circuit 100.

As illustrated in FIG. 5, the filter circuit 110 according to the first configuration example includes a first signal line 111 and second signal lines 113*a* and 113*b*. The first signal line 111 corresponds to the first signal line 101 in the filter circuit 100 illustrated in FIG. 4. Each of the second signal lines 113*a* and 113*b* corresponds to the second signal line 103 in the filter circuit 100 illustrated in FIG. 4. Note that in the example illustrated in FIG. 5, the first signal line 111 and the second signal lines 113*a* and 113*b* are formed on the same substrate.

The second signal line 113*a* is arranged so as to be located on the opposite side to the second signal line 113*b* relative to the first signal line 101 in the y-direction. Specifically, the second signal line 113*a* is arranged in the +y-direction, and the second signal line 113*b* is arranged in the −y-direction, relative to the first signal line 101. Note that in the example illustrated in FIG. 5, the second signal lines 113*a* and 113*b* are arranged so as to hold the first signal line 101 therebetween.

The second signal line 113*a* has end portions in a direction (x-direction) in which the second signal line 113*a* extends in parallel with the first signal line 101, and the end portions include an end portion in the −x-direction that is electrically connected to the first signal line 101 and an end portion in the +x-direction that is opened. On the other hand, the second signal line 113*b* has end portions in a direction (x-direction) in which the second signal line 113*b* extends in parallel with the first signal line 101, and the end portions includes an end portion in the +x-direction that is electrically connected to the first signal line 101 and an end portion in the −x-direction that is opened.

Furthermore, in a region W11 having a predetermined width and extending in the longitudinal direction (x-direction), including portions to which the second signal lines 113*a* and 113*b* are electrically connected, the first signal line 111 is formed to have a line width smaller than in the other region. Specifically, the first signal line 111 has ranges of desired widths where the second signal lines 113*a* and 113*b* extend forward and rearward in the longitudinal direction, from portions as the base points to which the second signal lines 113*a* and 113*b* are electrically connected, and in the ranges, the first signal line 111 is formed to have a line width smaller than in the other portions (e.g., the signal line 200). Furthermore, the line width of each of the second signal lines 113*a* and 113*b* is also formed so as to be smaller, as in the case of the first signal line 101.

Note that due to physical constraints on forming the first signal line 111 and the second signal lines 113*a* and 113*b*, the first signal line 111 and the second signal lines 113*a* and 113*b* each have a line width limited up to approximately 40 μm, even if formed as small as possible. On the other hand, if there is no physical constraints, each of the first signal line 111 and the second signal lines 113*a* and 113*b* may be formed to have a line width less than 40 μm. Furthermore, the widths of the region W11 in which the first signal line 111 is formed to have a smaller line width is determined according to an electrical characteristic (impedance) of the filter circuit 110. In other words, the region W11 desirably has a sufficient widths to form the first signal line 111 to have a smaller line width to the extent that a signal (e.g., a signal in the sub-6 GHz band) transmitted in the first signal line 111 is not influenced due to impedance mismatch.

Furthermore, in the first configuration example, of the regions extending in the longitudinal direction of the first signal line 111, the region W11 corresponds to an example of "first region", and the region other than the region W11 corresponds to an example of "second region".

The outline of the first configuration example of the filter circuit according to an embodiment of the present disclosure has been described above with reference to FIG. 5.

Example

Figure 6:
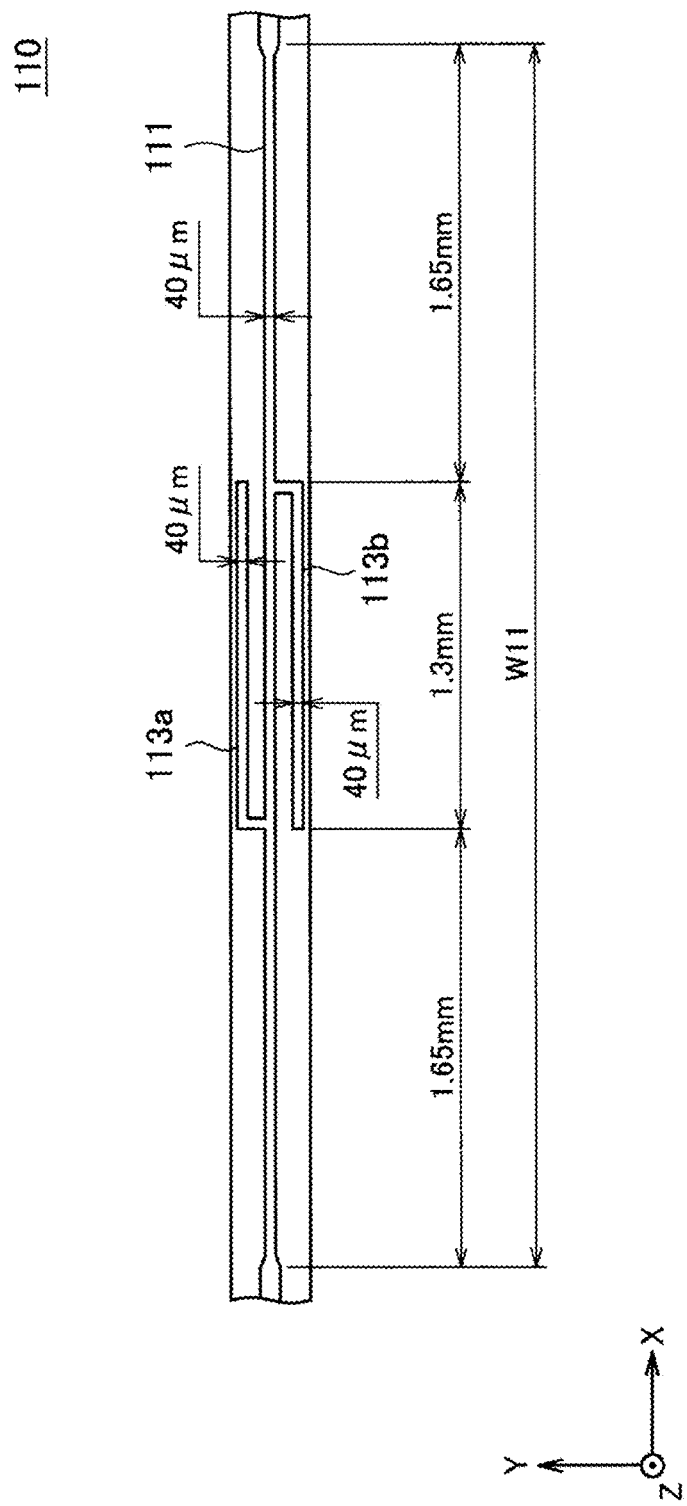
FIG. 6 is an explanatory diagram illustrating an example of a configuration of a filter circuit according to a first example.

Subsequently, as a first example, an example of the filter circuit according to the first configuration example will be described. For example, FIG. 6 is an explanatory diagram illustrating an example of the configuration of the filter circuit according to the first example. Note that the filter circuit 110 illustrated in FIG. 6 corresponds to the filter circuit 110 illustrated in FIG. 5. In other words, in FIG. 6, reference symbols 111, 113*a*, and 113*b* indicate the first signal line 111, the second signal line 113*a*, and the second signal line 113*b* of the filter circuit 110 illustrated in FIG. 5. Furthermore, as in the example illustrated in FIG. 5, a reference symbol W11 indicates the region where the line width of the first signal line 111 is formed smaller, in the range of the first signal line 111 in the longitudinal direction (x-direction).

In the example illustrated in FIG. 6, each of the second signal lines 113*a* and 113*b* is formed so as to have a length in the longitudinal direction (x-direction) of 1.3 mm and a line width of 40 μm. Furthermore, the first signal line 111 is formed so as to have a line width of 40 μm in the region W11. In other words, in a 1.3-mm-long region where the second signal lines 113*a* and 113*b* extend in parallel in the longitudinal direction (x-direction) and in 1.65-mm-long regions further extending from the 1.3-mm-long region in the +x-direction and the −x-direction, the first signal line 111 is formed to have a line width of 40 μm. Note that, at this time, the second signal lines 113*a* and 113*b* and a portion of the first signal line 111 corresponding to the region W11 are each formed to have a line width smaller than that of the signal line 200 (stripline). In this configuration, the signal line 200 has a portion provided with the filter circuit 110, and electrically connects the antenna and the radio communication unit (RF circuit) to each other.

Figure 7:
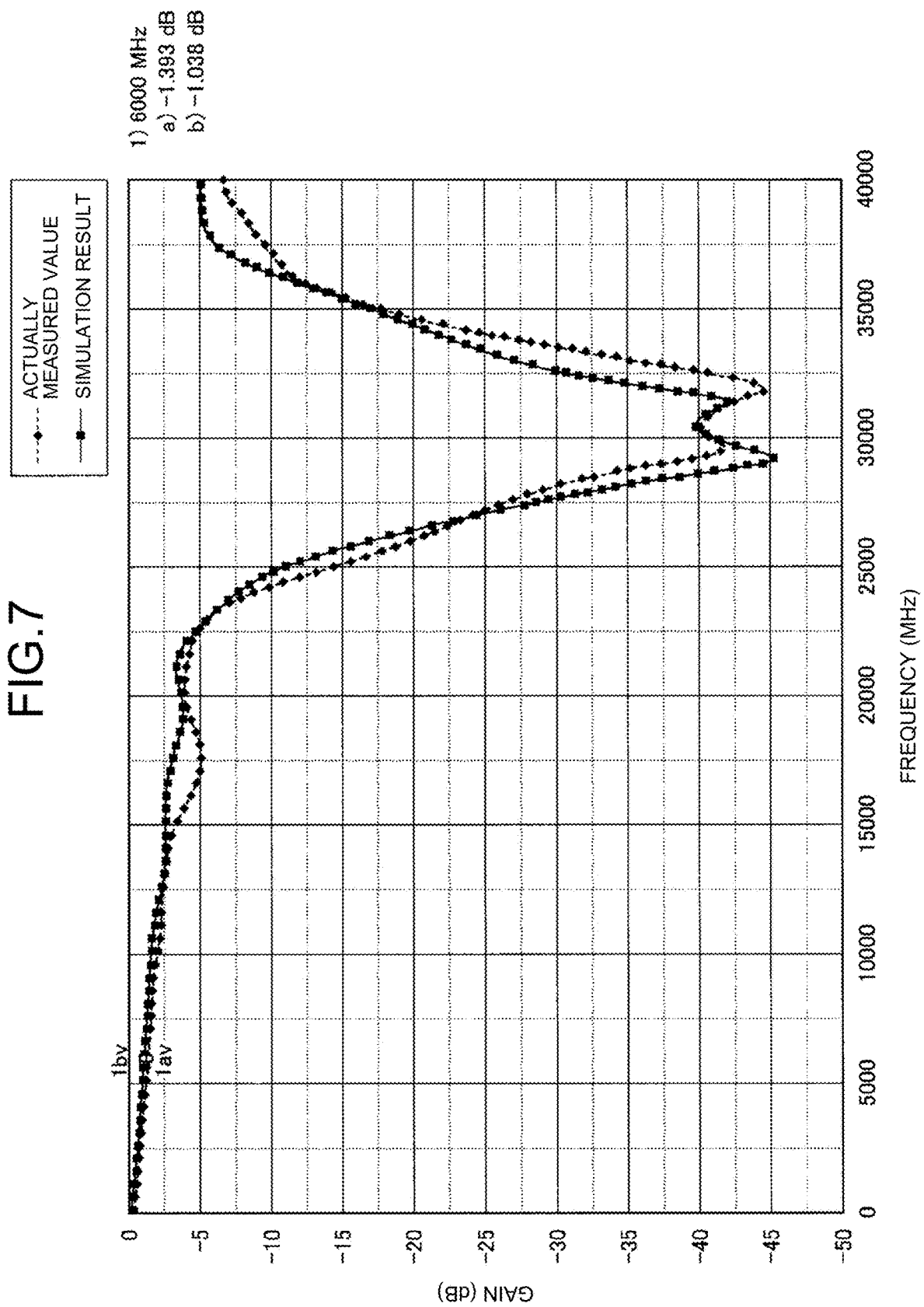
FIG. 7 is a graph illustrating an example of results of measurement of an electrical characteristic of the filter circuit according to the first example.

Next, with reference to FIG. 7, a description will be given of results of measurement of electrical characteristic of the filter circuit 110 having been described with reference to FIG. 6, that is, results of measurement of attenuation characteristic (i.e., frequency rejection characteristic) in a predetermined band. FIG. 7 is a graph illustrating an example of results of measurement of an electrical characteristic of the filter circuit according to the first example. In FIG. 7, the horizontal axis represents frequency. The vertical axis represents gain. Furthermore, in the example illustrated in FIG. 7, in addition to actually measured values of the electrical characteristic of the filter circuit 110 illustrated in FIG. 6, simulation results of the electrical characteristic of the filter circuit 110 are also illustrated. Note that for the simulation of the electric characteristic of the filter circuit 110, ANSYS HFSS (registered trademark) is used.

As illustrated in FIG. 7, it can be seen that the actually measured values of the electrical characteristic of the filter circuit 110 according to the first example substantially match the simulation results. Furthermore, as illustrated in FIG. 7, it can be seen that the filter circuit 110 according to the first example shows preferable frequency rejection characteristic (attenuation characteristics) in a frequency band of approximately 28 GHz to approximately 34 GHz of the millimeter-wave band, in both of the actually measured values of the electrical characteristic and the simulation results of the electrical characteristic.

As described above, as the first example, the example of the filter circuit according to the first configuration example has been described with reference to FIGS. 6 and 7.

3.3. Second Configuration Example

Next, as a second configuration example of the filter circuit according to an embodiment of the present disclosure, another example of the configuration of the filter circuit that is provided with a plurality of second signal lines 103 (i.e., stub lines) will be described. Note that in the following description, the filter circuit according to the second configuration example may be referred to as "filter circuit 120" for distinction thereof from a filter circuit according to another configuration example. On the other hand, when the filter circuit according to the second configuration example and a filter circuit according to another configuration example are not particularly distinguished from each other, the filter circuits may be referred to as "filter circuits 100".

Configuration

Figure 8:
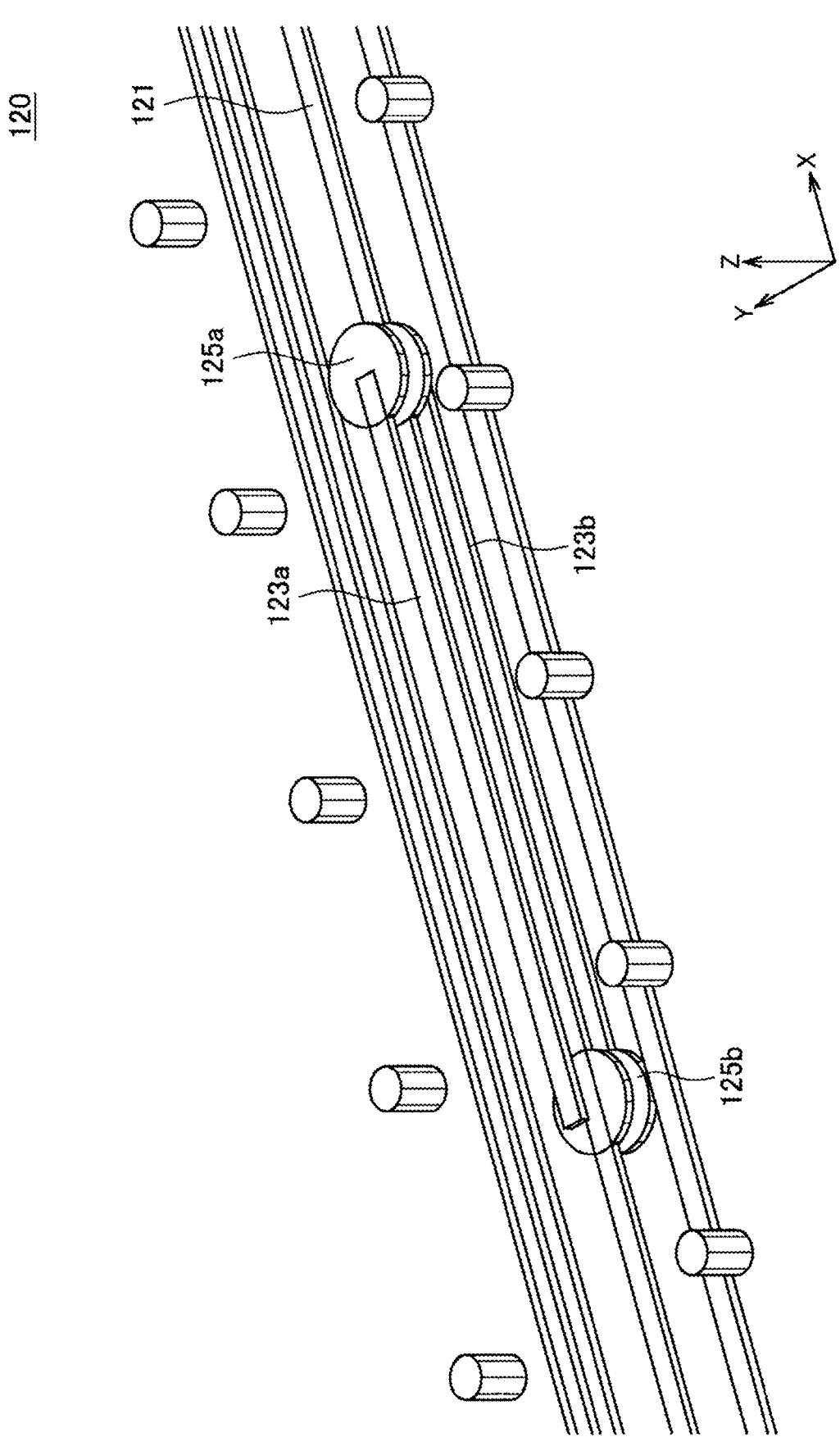
FIG. 8 is an explanatory diagram illustrating an outline of a second configuration example of the filter circuit according to the embodiment.

For example, FIG. 8 is an explanatory diagram illustrating an outline of the second configuration example of the filter circuit according to an embodiment of the present disclosure. An x-direction, y-direction, and z-direction in FIG. 8 correspond to the x-direction, y-direction, and z-direction in the example illustrated in FIG. 4.

As illustrated in FIG. 8, as the second configuration example, an example is illustrated in which when a signal line 200 that electrically connects an antenna and a radio communication unit (RF circuit) is arranged on a substrate having a laminated structure, part of the signal line 200 is configured as the filter circuit according to an embodiment of the present disclosure. Note that in the example illustrated in FIG. 8, for convenience, the upper surface side of the substrate on which the filter circuit 120 is arranged is represented as "+z-direction" and the lower surface side thereof is represented as "−z-direction".

The filter circuit 120 according to the second configuration example includes a first signal line 121 and second signal lines 123a and 123b. The first signal line 121 corresponds to the first signal line 101 in the filter circuit 100 illustrated in FIG. 4. Each of the second signal lines 123a and 123b corresponds to the second signal line 103 in the filter circuit 100 illustrated in FIG. 4.

As illustrated in FIG. 8, in the filter circuit 120, the second signal lines 123a and 123b are arranged in layers different from a layer in which the first signal line 121 is arranged (e.g., other layers positioned above and below the layer) in the substrate having a laminated structure. Each of the second signal lines 123a and 123b and the first signal line 121 are electrically connected by, for example, a via. In particular, in a substrate having a laminated structure, wiring or the like is sometimes arranged in each layer, but even in such a case, in a region where a stripline is arranged, each of layers above and below the layer in which the stripline is arranged often has a space where no other wiring is arranged. Therefore, in regions of the spaces in the layers above and below the layer in which the stripline (i.e., the first signal line 121) is arranged, the second signal lines 123a and 123b may be arranged. Note that as long as each of the second signal lines 123a and 123b located in different layers can be electrically connected to the first signal line 121, electrical connection is not necessarily limited to connection through the via.

Figure 9:
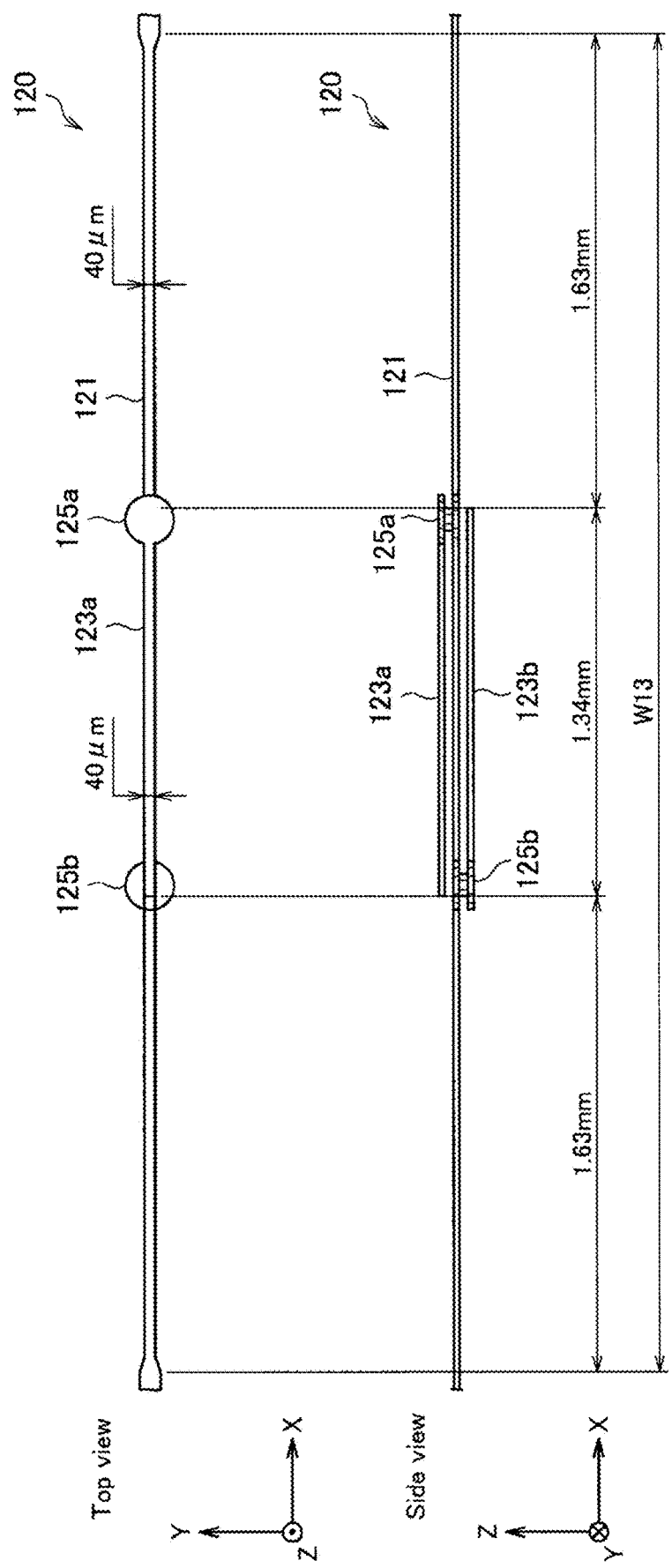
FIG. 9 is an explanatory diagram illustrating an example of a configuration of the filter circuit according to the second configuration example.

For example, FIG. 9 is an explanatory diagram illustrating an example of a configuration of the filter circuit according to the second configuration example. Specifically, an upper diagram of FIG. 9 corresponds to a schematic top view of the filter circuit 120 illustrated in FIG. 8, that is, a diagram of the filter circuit viewed in the +z-direction. Furthermore, a lower diagram of FIG. 9 corresponds to a schematic side view of the filter circuit 120, that is, a diagram of the filter circuit viewed in the −y-direction.

As illustrated in FIG. 9, the second signal line 123a is arranged in another layer located above (+z-direction) the layer in which the first signal line 121 is arranged. The second signal line 123a and the first signal line 121 are electrically connected through a via 125a. In other words, the via 125a is arranged so as to penetrate the layer in which the second signal line 123a is arranged and the layer in which the first signal line 121 is arranged. At this time, the second signal line 123a has end portions in a direction (x-direction) in which the second signal line 123a extends in parallel with the first signal line 121, and the end portions includes an end portion in the +x-direction that is electrically connected to the first signal line 101 through the via 125a and an end portion in the −x-direction that is opened.

Furthermore, the second signal line 123b is arranged in another layer located below (−z-direction) the layer in which the first signal line 121 is arranged. The second signal line 123b and the first signal line 121 are electrically connected through a via 125b. In other words, the via 125b is arranged so as to penetrate the layer in which the second signal line 123b is arranged and the layer in which the first signal line 121 is arranged. At this time, the second signal line 123b has end portions in a direction (x-direction) in which the second signal line 123b extends in parallel with the first signal line 121, and the end portions includes an end portion in the −x-direction that is electrically connected to the first signal line 101 through the via 125b and an end portion in the +x-direction that is opened.

Furthermore, in a region W13 having a predetermined widths and extending in the longitudinal direction (x-direction), including portions to which the second signal lines 123a and 123b are electrically connected, the first signal line 121 is formed to have a line width smaller than in the other region. Specifically, the first signal line 121 has ranges of desired widths where the second signal lines 123a and 123b extend forward and rearward in the longitudinal direction, from portions as the base points to which the second signal lines 123a and 123b are electrically connected through the vias (i.e., vias 125a and 125b), and in the ranges, the first signal line 121 is formed to have a line width smaller than in the other portions (e.g., the signal line 200). Furthermore, the line width of each of the second signal lines 123a and 123b is also formed so as to be smaller, as in the case of the first signal line 121.

Note that the line widths of the first signal line 121 and second signal lines 123a and 123b are similar to those of the first signal line 111 and second signal lines 113a and 113b in the filter circuit 110 according to the first configuration example described above. In other words, due to physical constraints on processing, the line widths are limited to approximately 40 µm even if formed as small as possible, but if there is no physical constraints, the line widths may be formed smaller than 40 µm. Furthermore, the width of the region W13 in which the first signal line 121 is formed to have a smaller line width is determined according to an electrical characteristic (impedance) of the filter circuit 120. In other words, the region W13 desirably has a sufficient width to the extent that a signal (e.g., a signal in the sub-6 GHz band) transmitted in the first signal line 121 is not influenced due to impedance mismatch. Furthermore, in the second configuration example, of the regions extending in the longitudinal direction of the first signal line 121, the region W13 corresponds to an example of "first region", and the region other than the region W13 corresponds to an example of "second region".

The outline of the second configuration example of the filter circuit according to an embodiment of the present disclosure has been described above with reference to FIGS. 8 and 9.

Example

Subsequently, as a second example, an example of the filter circuit according to the second configuration example will be described.

In the example illustrated in FIG. 9, each of the second signal lines 123a and 123b is formed so as to have a length in the longitudinal direction (x-direction) of 1.34 mm and a line width of 40 µm. Furthermore, the first signal line 121 is formed so as to have a line width of 40 µm in the region W13. In other words, in a 1.34-mm-long region where the second signal lines 123a and 123b extend in parallel in the longitudinal direction (x-direction) and in 1.63-mm-long regions further extending from the 1.34-mm-long region in the +x-direction and the −x-direction, the first signal line 121 is formed to have a line width of 40 µm. Note that, at this time, the second signal lines 123a and 123b and a portion of the first signal line 121 corresponding to the region W13 are each formed to have a line width smaller than that of the signal line 200 (stripline). In this configuration, the signal line 200 has a portion provided with the filter circuit 120, and electrically connects the antenna and the radio communication unit (RF circuit) to each other.

Figure 10:
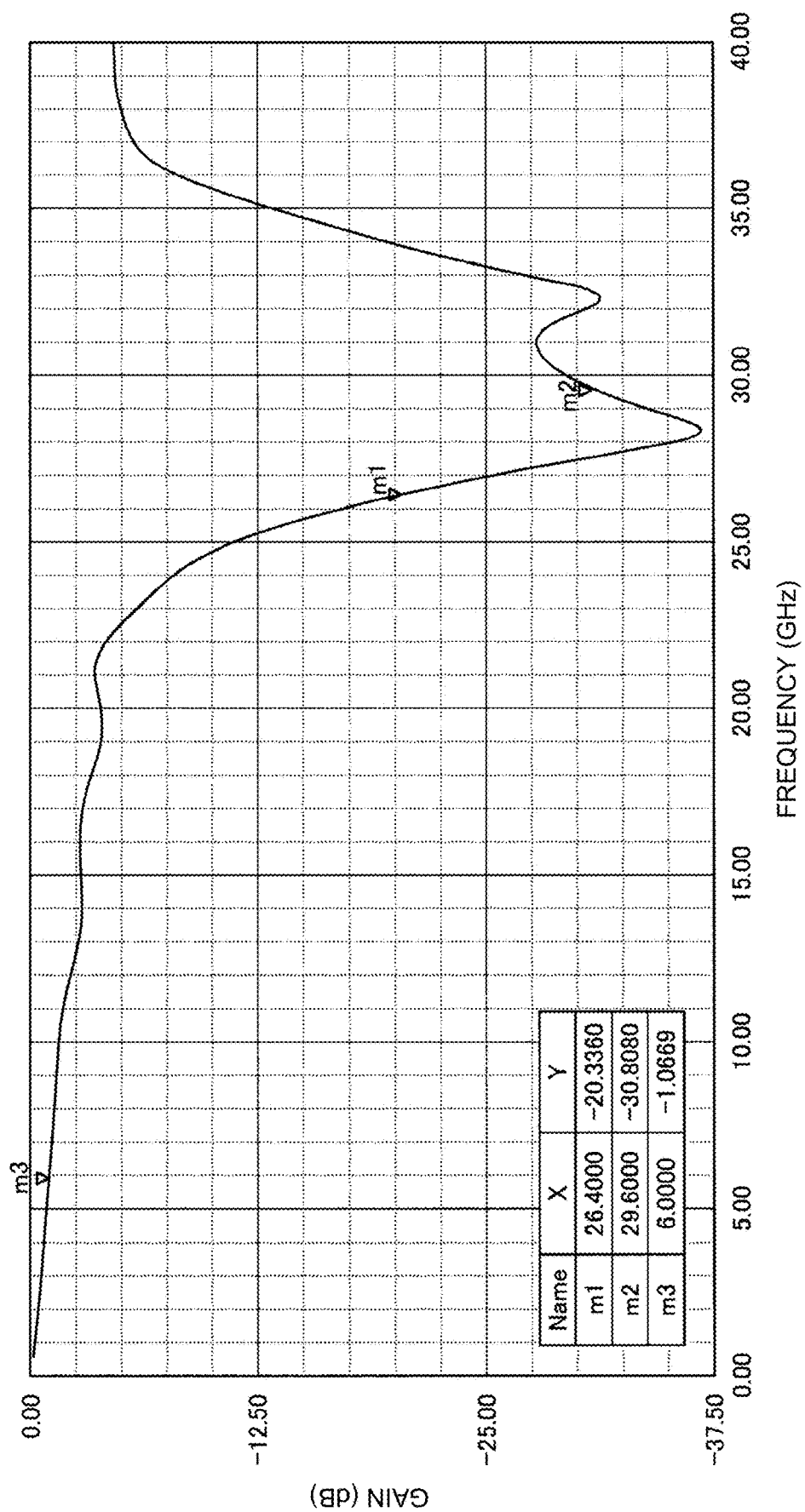
FIG. 10 is a graph illustrating an example of results of measurement of an electrical characteristic of the filter circuit according to the second example.

Next, with reference to FIG. 10, a description will be given of results of measurement of electrical characteristic of the filter circuit 120 having been described with reference to FIG. 9, that is, results of measurement of attenuation characteristic (i.e., frequency rejection characteristic) in a predetermined band. FIG. 10 is a graph illustrating an example of results of measurement of an electrical characteristic of the filter circuit according to the second example. In FIG. 10, the horizontal axis represents frequency. The vertical axis represents gain.

As illustrated in FIG. 10, it can be seen that the filter circuit 120 according to the second example shows preferable frequency rejection characteristic (attenuation characteristic) in a frequency band of approximately 28 GHz to approximately 33 GHz (in particular, in the vicinity of 28 GHz) of the millimeter-wave band, in results of measurement of the electrical characteristic.

As described above, as the second example, the example of the filter circuit according to the second configuration example has been described with reference to FIGS. 9 and 10.

3.4. Third Configuration Example

Next, as a third configuration example of the filter circuit according to an embodiment of the present disclosure, an example of a configuration of a filter circuit that supports so-called dual band to block signals of a plurality of frequencies as blocking targets will be described. Note that in the following description, the filter circuit according to the third configuration example may be referred to as "filter circuit 130" for distinction thereof from a filter circuit according to another configuration example. On the other hand, when the filter circuit according to the third configuration example and a filter circuit according to another configuration example are not particularly distinguished from each other, the filter circuits may be referred to as "filter circuits 100".

Configuration

Figure 11:
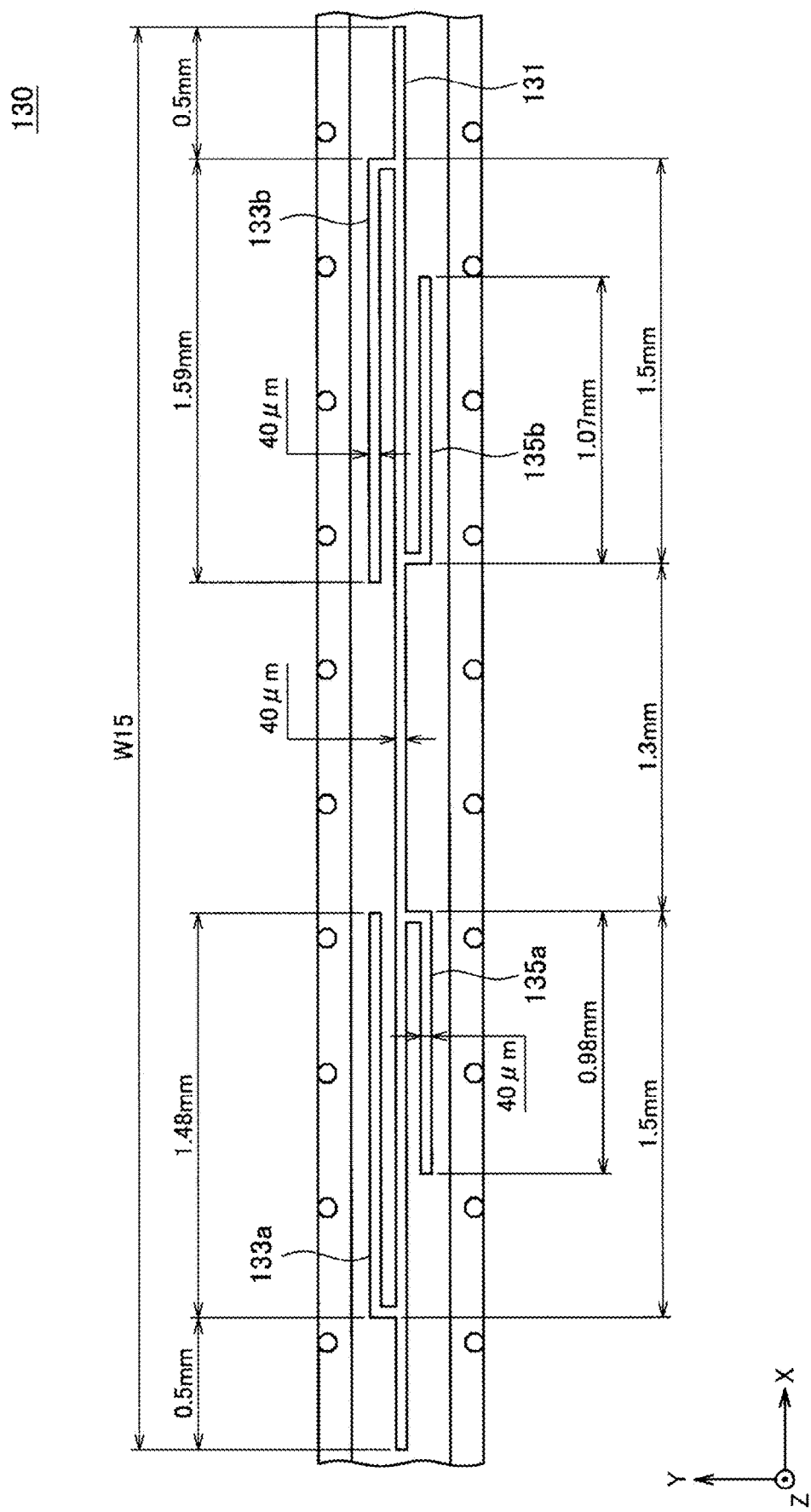
FIG. 11 is an explanatory diagram illustrating an outline of a third configuration example of the filter circuit according to the embodiment.

For example, FIG. 11 is an explanatory diagram illustrating an outline of the third configuration example of the filter circuit according to an embodiment of the present disclosure. An x-direction, y-direction, and z-direction in FIG. 11 correspond to the x-direction, y-direction, and z-direction in the example illustrated in FIG. 4. Note that in the filter circuit 130 illustrated in FIG. 11, signals of two different frequencies of the millimeter-wave band are to be blocked as the blocking target.

As illustrated in FIG. 11, the filter circuit 130 according to the third configuration example includes a first signal line 131, second signal lines 133a and 133b, and second signal lines 135a and 135b. The first signal line 131 corresponds to the first signal line 101 in the filter circuit 100 illustrated in FIG. 4. Each of the second signal lines 133a and 133b and each of the second signal lines 135a and 135b correspond to the second signal line 103 in the filter circuit 100 illustrated in FIG. 4. Furthermore, the second signal lines 133a and 133b contribute to blocking of a signal of one frequency (hereinafter, also referred to as "first frequency") of the signals of two frequencies that are the blocking targets. In other words, the lengths of the second signal lines 133a and 133b in the longitudinal direction (x-direction) are determined according to the first frequency. Furthermore, the second signal lines 135a and 135b contribute to blocking of a signal of the other frequency (hereinafter, also referred to as "second frequency") different from the first frequency, of the signals of two frequencies that are the blocking targets. In other words, the lengths of the second signal lines 135a and 135b in the longitudinal direction (x-direction) are determined according to the second frequency. Furthermore, in the example illustrated in FIG. 11, the first signal line 131, the second signal lines 133a and 133b, and the second signal lines 135a and 135b are formed on the same substrate.

The second signal lines 133a and 133b are arranged at different positions in the longitudinal direction (x-direction) of the first signal line 131 so as to extend in parallel with the first signal line 131. For example, in the example illustrated in FIG. 11, each of the second signal lines 133a and 133b is arranged so as to be located in the +y-direction relative to the first signal line 131. At this time, the second signal line 133a is arranged so as to be located in the −x-direction, and the second signal line 133b is arranged so as to be located in the +x-direction. The second signal line 133a has end portions in a direction (x-direction) in which the second signal line 133a extends in parallel with the first signal line 131, and the end portions include an end portion in the −x-direction that is electrically connected to the first signal line 131 and an end portion in the +x-direction that is opened. On the other hand, the second signal line 133b has end portions in a direction (x-direction) in which the second signal line 133b extends in parallel with the first signal line 131, and the end portions include an end portion in the +x-direction that is electrically connected to the first signal line 131 and an end portion in the −x-direction that is opened.

The second signal lines 135a and 135b are arranged at different positions in the longitudinal direction (x-direction) of the first signal line 131 so as to extend in parallel with the first signal line 131. For example, in the example illustrated in FIG. 11, each of the second signal lines 135a and 135b is arranged so as to be located in the −y-direction relative to the first signal line 131. At this time, the second signal line 135a is arranged so as to be located in the −x-direction, and the second signal line 135b is arranged so as to be located in the +x-direction. The second signal line 135a has end portions in a direction (x-direction) in which the second signal line 135a extends in parallel with the first signal line 131, and the end portions include an end portion in the +x-direction that is electrically connected to the first signal line 131 and an end portion in the −x-direction that is opened. On the other hand, the second signal line 133b has end portions in a direction (x-direction) in which the second signal line 133b extends in parallel with the first signal line 131, and the end portions include an end portion in the −x-direction that is electrically connected to the first signal line 131 and an end portion in the +x-direction that is opened.

Note that in the example illustrated in FIG. 11, the second signal line 135a is arranged so as to be located on the opposite side to the second signal line 133a relative to the first signal line 131 in the y-direction. Furthermore, the second signal line 135b is arranged so as to be located on the opposite side to the second signal line 133b relative to the first signal line 131 in the y-direction. On the other hand, this configuration is merely an example and does not necessarily limit the configuration of the filter circuit 130 according to the third configuration example. In other words, even if a configuration corresponding to a second signal line 103 (i.e., corresponding to a stub line, e.g., any of the second signal line 133a, 133b, 135a, and 135b) is provided in one of y-directions relative to the first signal line 131, a configuration corresponding to the other second signal line 103 does not necessarily need to be provided in the other of the y-directions.

Furthermore, in the example illustrated in FIG. 11, the first signal line 131, the second signal lines 133a and 133b, and the second signal lines 135a and 135b are formed on the same substrate. However, this configuration is merely an example and does not necessarily limit the configuration of the filter circuit 130 according to the third configuration example. As a specific example, as in the filter circuit 120 according to the second configuration example, when part of the signal line 200 arranged on the substrate having a laminated structure is configured as the filter circuit 130, at least some of configurations corresponding to the second signal line 103 may be arranged in layers different from a layer in which the first signal line 131 is arranged. In other words, in the example illustrated in FIG. 11, at least some of the second signal lines 133a, 133b, 135a, and 135b may be arranged in layers different from the layer in which the first signal line 131 is arranged.

Furthermore, in a region W15 having a predetermined width and extending in the longitudinal direction (x-direction), including portions to which the second signal lines 133a, 133b, 135a, and 135b are electrically connected, the first signal line 131 is formed to have a line width smaller than in the other region. Specifically, the first signal line 131 has ranges of desired widths where the second signal lines 133a, 133b, 135a, and 135b extend forward and rearward in the longitudinal direction, from portions as the base points to which the second signal lines 133a, 133b, 135a, and 135b are electrically connected, and in the ranges, the first signal line 131 is formed to have a line width smaller than in the other portions (e.g., the signal line 200). Furthermore, the line width of each of the second signal lines 133a, 133b, 135a, and 135b is also formed so as to be smaller, as in the case of the first signal line 131.

Note that the line widths of the first signal line 131 and second signal lines 133a, 133b, 135a, and 135b are similar to those of the first signal line 111 and second signal lines 113a and 113b in the filter circuit 110 according to the first configuration example described above. In other words, due to physical constraints on processing, the line widths are limited to approximately 40 μm even if formed as small as possible, but if there is no physical constraints, the line widths may be formed smaller than 40 μm. Furthermore, the width of the region W15 in which the first signal line 131 is formed to have a smaller line width is determined according to an electrical characteristic (impedance) of the filter circuit 130. In other words, the region W15 desirably has a sufficient width to the extent that a signal (e.g., a signal in the sub-6 GHz band) transmitted in the first signal line 131 is not influenced due to impedance mismatch. Furthermore, in the third configuration example, of the regions extending in the longitudinal direction of the first signal line 131, the region W15 corresponds to an example of "first region", and the region other than the region W15 corresponds to an example of "second region".

The outline of the third configuration example of the filter circuit according to an embodiment of the present disclosure has been described above with reference to FIG. 11.

Example

Subsequently, as a third example, an example of the filter circuit according to the third configuration example will be described.

In the example illustrated in FIG. 11, the second signal lines 133a and 133b are formed so that the second signal line 133a has a length of 1.48 mm and the second signal line 133b has a length of 1.58 mm, in the longitudinal direction (x-direction) and both have a line width of 40 μm. Furthermore, the second signal lines 135a and 135b are formed so that the second signal line 135a has a length of 0.98 mm and the second signal line 135b has a length of 1.07 mm, in the longitudinal direction (x-direction) and both have a line width of 40 μm.

The second signal line 135a has an end portion in the +x-direction, and the end portion is electrically connected to the first signal line 131 at a position spaced 1.5 mm apart in the +x-direction from a position as the base point where the second signal line 133a is electrically connected to the first signal line 131. Furthermore, the second signal line 135b has an end portion in the −x-direction, and the end portion is electrically connected to the first signal line 131 at a position spaced 1.5 mm apart in the −x-direction from a position as the base point where the second signal line 133b is electrically connected to the first signal line 131. The positions where the second signal lines 135a and 135 are electrically connected to the first signal line 131 are spaced 1.3 mm apart in the x-direction.

Furthermore, the first signal line 131 is formed so as to have a line width of 40 μm in the region W15. In other words, in a 4.3-mm-long region located between the positions where the second signal lines 133a and 133b are electrically connected to the first signal line 131 and in 0.5-mm-long regions further extending from the 4.3-mm-long region in the +x-direction and the −x-direction, the first signal line 131 is formed to have a line width of 40 μm. Note that, at this time, the second signal lines 133a, 133b, 135a, and 135b and a portion of the first signal line 131 corresponding to the region W13 are each formed to have a line width smaller than that of the signal line 200 (stripline). In this configuration, the signal line 200 has a portion provided with the filter circuit 130, and electrically connects the antenna and the radio communication unit (RF circuit) to each other.

Figure 12:
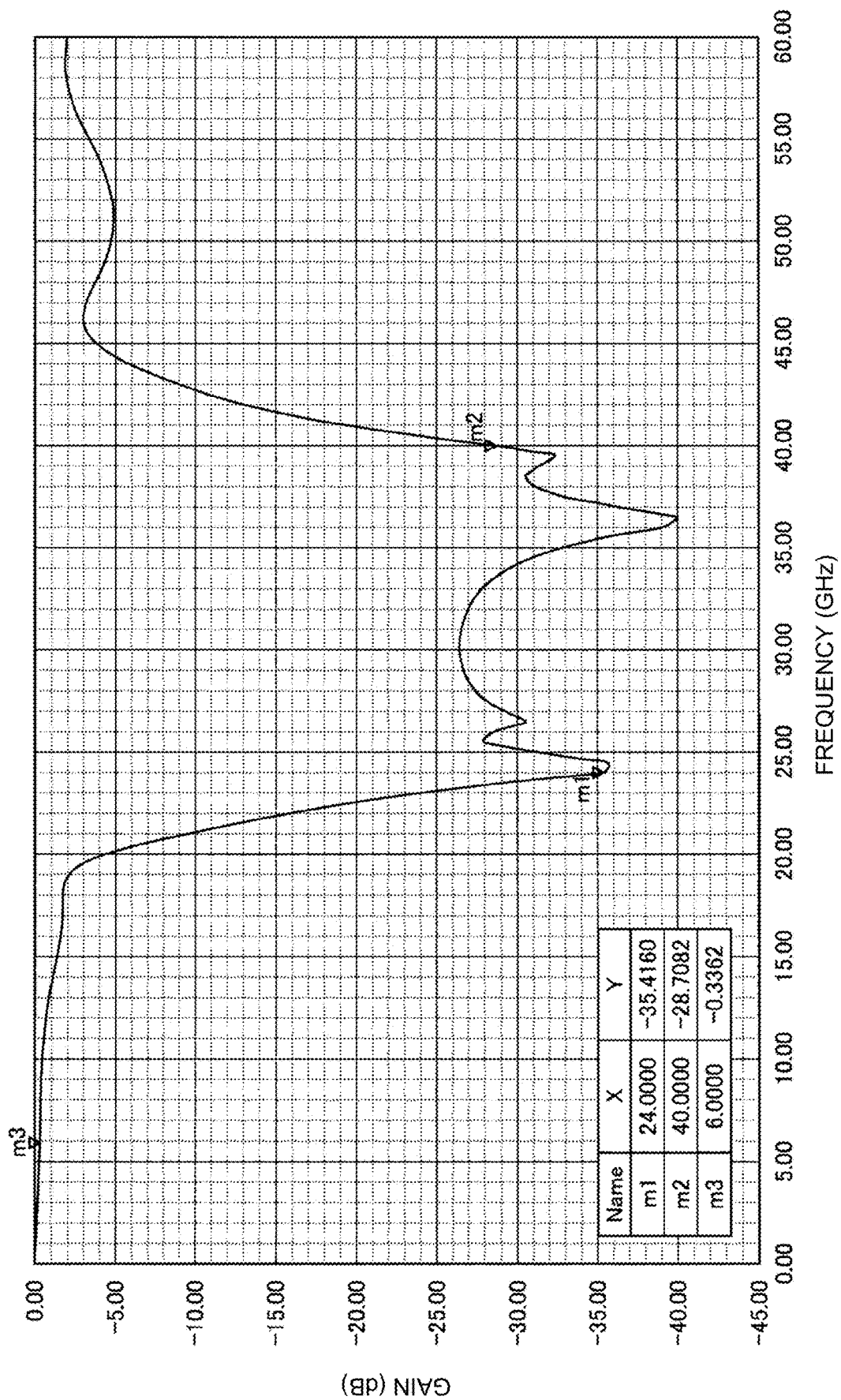
FIG. 12 is a graph illustrating an example of results of measurement of an electrical characteristic of the filter circuit according to the third example.

Next, with reference to FIG. 12, a description will be given of results of measurement of electrical characteristic of the filter circuit 130 having been described with reference to FIG. 11, that is, results of measurement of attenuation characteristic (i.e., frequency rejection characteristic) in a predetermined band. FIG. 12 is a graph illustrating an example of results of measurement of an electrical characteristic of the filter circuit according to the third example. In FIG. 12, the horizontal axis represents frequency. The vertical axis represents gain.

As illustrated in FIG. 12, it can be seen that the filter circuit 130 according to the third example shows preferable frequency rejection characteristic (attenuation characteristic) in a frequency band of approximately 24 GHz to approximately 39 GHz of the millimeter-wave band, in results of measurement of the electrical characteristic. More specifically, the filter circuit 130 shows particularly preferable frequency rejection characteristics in the vicinities of 24 GHz and 36 GHz. Note that, of the frequencies at which the filter circuit 130 shows particularly preferable frequency rejection characteristics, a frequency in the vicinity of 24 GHz corresponds to an example of the first frequency, and a frequency in the vicinity of 36 GHz corresponds to an example of the second frequency. In other words, in FIG. 11, the second signal lines 133a and 133b mainly contribute to blocking of signals in the vicinity of 24 GHz. In addition, the second signal lines 135a and 135b mainly contribute to the blocking of signals in the vicinity of 36 GHz.

As described above, as the third example, the example of the filter circuit according to the third configuration example has been described with reference to FIGS. 11 and 12.

3.5. Supplementary Notes

As an example of a configuration of the filter circuit according to an embodiment of the present disclosure, the first configuration example to third configuration examples have been described. On the other hand, these configuration examples are merely examples and do not necessarily limit the configuration of the filter circuit according to an embodiment of the present disclosure. For example, two or more configuration examples of the first configuration example to third configuration examples may be combined. Furthermore, the configuration of the filter circuit may be appropriately modified without departing from the basic concept for achieving the filter circuit described above as the basic configuration of the filter circuit according to an embodiment of the present disclosure.

4. CONCLUSION

As described above, the filter circuit according to an embodiment of the present disclosure includes the first signal line that is arranged so as to extend longitudinally and the second signal line that is arranged to extend in parallel with the first signal line. The second signal line has one end in the longitudinal direction that is electrically connected to the first signal line and the other end that is open, and the length in the longitudinal direction is determined according to the frequency of a signal to be blocked of signals transmitted through the first signal line.

With the above configuration, it is possible to achieve a filter circuit that shows a good electrical characteristic (frequency rejection characteristic) in the millimeter-wave band compared with a conventional SAW filter, BAW filter, laminated filter, and the like. In addition, the filter circuit according to an embodiment of the present disclosure can have a further limited occupied area compared with a conventional stub filter due to the above-described structural features. In other words, according to an embodiment of the present disclosure, it is possible to achieve a filter circuit that is configured to have a good frequency rejection characteristic and suppress an increase in size due to mounting, in a more preferred aspect.

Note that in the above description, the filter circuit according to an embodiment of the present disclosure has been described in view of application thereof to a communication device such as a so-called smartphone. On the other hand, the filter circuit according to an embodiment of the present disclosure can be applied to not only the smartphone or the like but also a communication device as configured to transmit and receive a radio signal in a frequency band different from the millimeter-wave band, such as the sub-6 GHz band, in addition to a radio signal in the millimeter-wave band. As a specific example, the filter circuit according to an embodiment of the present disclosure can be applied as a frequency rejection filter interposed between an antenna and a radio communication unit (RF circuit), in a mobile body such as a drone and vehicle, a so-called wireless router, and the like. In particular, the filter circuit according to an embodiment of the present disclosure can suppress an increase in size due to mounting, owing to the above-described structural features, and thus, the filter circuit is preferably applied particularly to a communication device that is required to be downsized.

The preferred embodiments of the present disclosure have been described above in detail with reference to the accompanying drawings, but the technical scope of the present disclosure is not limited to those examples. It is obvious for those skilled in the art to conceive various modification examples or alteration examples within the technical scope of the appended claims, and thus it is understood that the examples are included within the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Additionally, the present technology may also be configured as below.

(1) A filter circuit comprising:
a first signal line that is arranged to extend longitudinally; and
a second signal line that is arranged to extend in parallel with the first signal line,
wherein the second signal line has
one end that is electrically connected to the first signal line, and another end that is open, in a longitudinal direction, and
a length in the longitudinal direction that is determined according to a frequency of a signal to be blocked of signals transmitted through the first signal line.

(2) The filter circuit according to (1), further comprising a plurality of the second signal lines.

(3) The filter circuit according to (2), wherein, of the plurality of the second signal lines, some of the second signal lines are arranged to be located on an opposite side to other second signal lines relative to the first signal line.

(4) The filter circuit according to (3), wherein the some of the second signal lines each have end portions in a direction in which the second signal line extends in parallel with the first signal line, and of the end portions, an end portion is electrically connected to the first signal line and located on the opposite side to an end portion where each of the other second signal lines is electrically connected to the first signal line.

(5) The filter circuit according to any one of (2) to (4), wherein, of the plurality of the second signal lines, some of the second signal lines are arranged at positions different from positions where other second signal lines are arranged, in positions in a longitudinal direction of the first signal line.

(6) The filter circuit according to any one of (2) to (5), wherein the second signal line is arranged on a substrate on which the first signal line is arranged.

(7) The filter circuit according to any one of (2) to (5), wherein the second signal line is arranged in a layer different from a layer in which the first signal line is arranged, in a substrate having a laminated structure.

(8) The filter circuit according to (7), wherein the first signal line and the second signal line that are arranged in a plurality of respective different layers are electrically connected through a via arranged so as to penetrate the plurality of layers.

(9) The filter circuit according to any one of (2) to (8), wherein, of the plurality of the second signal lines, lengths of some of the second signal lines in a longitudinal direction are each determined according to a first frequency, and lengths of other second signal lines in a longitudinal direction are each determined according to a second frequency.

(10) The filter circuit according to any one of (1) to (9), wherein, in a first region including a portion where the second signal line is electrically connected of a region in a longitudinal direction, the first signal line is formed to have a line width smaller than a line width in a second region different from the first region.

(11) The filter circuit according to (10), wherein at least one of a width of the first region and a line width of the first signal line in the first region is determined according to an electrical characteristic of the second signal line.

(12) A communication device comprising:
a communication unit that controls a radio signal to be transmitted or received via an antenna; and
a filter circuit that is arranged so as to be interposed between the antenna and the communication unit,
wherein the filter circuit includes
a first signal line that is arranged so as to extend longitudinally, and
a second signal line that is arranged so as to extend in parallel with the first signal line,
the second signal line has
one end that is electrically connected to the first signal line, and another end that is open, in a longitudinal direction, and
a length in the longitudinal direction that is determined according to a frequency of a signal to be blocked, of signals transmitted through the first signal line, and
the first signal line has one end that is electrically connected to the antenna, and another end that is electrically connected to the communication unit, in a longitudinal direction.

REFERENCE SIGNS LIST

1 COMMUNICATION DEVICE
10 FIRST COMMUNICATION UNIT
11 ANTENNA UNIT
13 RADIO COMMUNICATION UNIT
15 FILTER CIRCUIT
20 SECOND COMMUNICATION UNIT
21 ANTENNA UNIT
23 RADIO COMMUNICATION UNIT
100 FILTER CIRCUIT
101 FIRST SIGNAL LINE
103 SECOND SIGNAL LINE
200 SIGNAL LINE

The invention claimed is:

1. A filter circuit, comprising:
a first signal line that is arranged to extend longitudinally; and
a plurality of second signal lines that are arranged to extend in parallel with the first signal line,
wherein each of the second signal lines has:
one end that is electrically connected to the first signal line, and another end that is open, in a longitudinal direction, and
a length in the longitudinal direction that is determined according to a frequency of a signal to be blocked of signals transmitted through the first signal line,
wherein at least one of the plurality of second signal lines and another of the plurality of second signal lines are arranged so that the first signal line is positioned therebetween and each of the one of the plurality second signal lines, the another of the plurality of second signal lines, and the first signal line are arranged in different layers in a substrate having a laminated structure.

2. The filter circuit according to claim 1, wherein the some of the plurality of second signal lines each have end portions in a direction in which the second signal line extends in parallel with the first signal line, and of the end portions, an end portion is electrically connected to the first signal line and located on the opposite side to an end portion where each of the other second signal lines is electrically connected to the first signal line.

3. The filter circuit according to claim 1, wherein, of the plurality of the second signal lines, some of the second signal lines are arranged at positions different from positions where other second signal lines are arranged, in positions in a longitudinal direction of the first signal line.

4. The filter circuit according to claim 1, wherein the plurality of second signal lines are arranged on a substrate on which the first signal line is arranged.

5. The filter circuit according to claim 1, wherein the first signal line and the second signal lines that are arranged in a plurality of respective different layers are electrically connected through a via arranged so as to penetrate the plurality of layers.

6. The filter circuit according to claim 1, wherein, of the plurality of the second signal lines, lengths of some of the second signal lines in a longitudinal direction are each determined according to a first frequency, and lengths of other second signal lines in a longitudinal direction are each determined according to a second frequency.

7. The filter circuit according to claim 1, wherein, in a first region including a portion where at least one of the second signal lines is electrically connected of a region in a longitudinal direction, the first signal line is formed to have a line width smaller than a line width in a second region different from the first region.

8. The filter circuit according to claim 7, wherein at least one of a width of the first region and a line width of the first signal line in the first region is determined according to an electrical characteristic of the at least one of the second signal lines.

9. A communication device comprising:
a transceiver that controls a radio signal to be transmitted or received via an antenna; and
a filter circuit that is arranged so as to be interposed between the antenna and the communication unit,
wherein the filter circuit includes
a first signal line that is arranged so as to extend longitudinally, and
a plurality of second signal lines that are arranged to extend in parallel with the first signal line,
wherein each of the second signal lines has
one end that is electrically connected to the first signal line, and another end that is open, in a longitudinal direction, and
a length in the longitudinal direction that is determined according to a frequency of a signal to be blocked, of signals transmitted through the first signal line,
wherein at least one of the plurality of second signal lines and another of the plurality of second signal lines are arranged so that the first signal line is positioned therebetween and each of the one of the plurality second signal lines, the another of the plurality of second signal lines, and the first signal line are arranged in different layers in a substrate having a laminated structure, and
the first signal line has one end that is electrically connected to the antenna, and another end that is electrically connected to the transceiver, in a longitudinal direction.

* * * * *